April 1, 1952  W. T. TIERNEY, JR., ET AL  2,591,025
COMBINATION SPARK-GLOW PLUG
Filed April 14, 1949
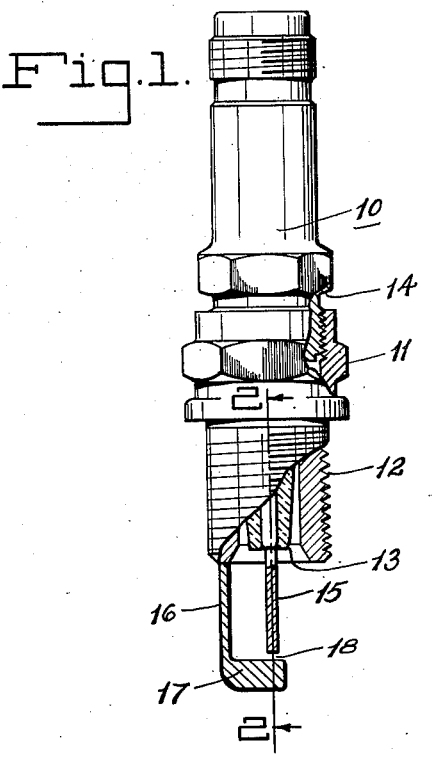
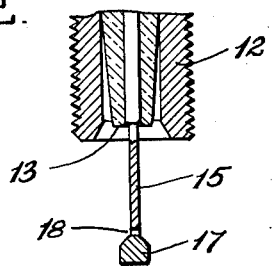
INVENTORS
WILLIAM T. TIERNEY
CHARLES W. DAVIS
BY
ATTORNEYS Patented Apr. 1, 1952

2,591,025

UNITED STATES PATENT OFFICE 2,591,025

COMBINATION SPARK-GLOW PLUG

William T. Tierney, Jr., Hopewell Junction, and Charles W. Davis, Jr., Fishkill, N. Y., assignors to The Texas Company, New York, N. Y., a corporation of Delaware Application April 14, 1949, Serial No. 87,548

2 Claims. (Cl. 123—169)

1

This invention relates to a combination spark-glow plug for the ignition system of an internal combustion engine.

One of the principal objects of the invention is to provide an ignition plug of this character which affords both spark and glow ignition on each engine cycle during normal operation of the engine.

A further object of the invention is to provide a plug of this character wherein one or both of the electrodes are constructed to provide a heat-retaining glow portion that will retain its incandescence between successive engine cycles.

A still further object of the invention is to provide a plug of this character wherein the electrodes are of sufficient length to protrude, when the plug is mounted on the engine cylinder, into the active portion of the cylinder combustion space so as to be directly exposed to the combustible gases and the heat of combustion, and at the same time to effectively insulate the glow portion of the electrode from sufficient loss of heat as to maintain said glow portion incandescent between engine cycles.

Other objects and advantages of the invention will be apparent from the following description when taken in conjunction with the attached drawing and appended claims.

The combination spark-glow plug of the present invention is particularly designed for use in connection with the non-knocking fuel injection engine disclosed and claimed in the co-pending application of Everett M. Barber, Serial No. 10,598, filed February 25, 1948, now Patent No. 2,484,009, dated October 11, 1949. In this engine, the first increment of injected fuel is electrically ignited substantially as soon as combustible fuel vapor-air mixture is formed therefrom at the very beginning of the injection period. Consequently, preignition is not a problem and the provision of a glow plug which effectively retains its incandescence of igniting character between successive engine cycles is an advantage rather than a detriment as in the conventional type of Otto cycle engine. Following ignition of the first increment of injected fuel as pointed out above, which occurs in a localized portion or segment of the combustion space with the establishment of a flame front, fuel injection is continued into the compressed combustion air immediately in advance of the flame front, while the compressed combustion air and the locus of fuel injection are moved relatively to each other in an orderly manner throughout the balance of the injection period. The net result is that additional increments of combustible fuel vapor-air mixture are progressively formed, ignited by the advancing flame front and burned substantially as rapidly as produced. In this manner, there is no opportunity for the accumulation in the combustion space of sufficient unburned combustible mixture as to be susceptible of spontaneous combustion with the resultant knocking of the engine.

In the operation of an engine of this character, there is a requirement for coordination between the beginning of injection on a cycle and the timing of spark ignition when a conventional spark plug is employed. While a simple spark plug will suffice ordinarily, it is found that the additional provision of the glow surface is advantageous in insuring proper ignition on each cycle when erratic injections are encountered such as would otherwise cause missing of the engine. The present invention thus provides a combination of spark and glow ignition which has proved very satisfactory in an engine of this character.

In the drawing, which discloses a preferred embodiment of the invention,

Figure 1 is a side elevational view partly in section of a combination spark-glow plug constructed in accordance with the present invention; and Figure 2 is a partial vertical sectional view taken on the plane of the line 2—2 of Figure 1.

Referring to the drawing, the body of the plug is indicated generally by the numeral 10. This plug body may be of entirely conventional construction and forms no part of the present invention, so detailed illustration thereof is unnecessary. Any of the conventional types of plug bodies having the usual metal shell 11 with reduced threaded neck 12 for insertion in the head of an internal combustion engine cylinder, the inner insulating core 13 and coupling nut 14 for holding the parts in assembled relationship, can be employed. Rigidly mounted in the insulating core 13 is an axial insulated wire electrode 15. In accordance with the present invention, this electrode is extended to depend at least ¼" and up to about 1" or more, depending upon the depth of the combustion space of the engine at top dead center of the piston stroke, below the lower end of the metal shell 11 of the plug. Attached to the metal shell 11 is an outer grounded wire electrode 16 which depends vertically below the shell 11 a distance slightly greater than that of electrode 15. Also, in accordance with the present invention, the electrode 16 is provided at its lower end with a glow portion 17 extending inwardly at substantially right angles to the vertically depending wire portion so as to underlie the lower end of electrode 15 and form a spark gap 18 therebetween.

As shown in Figures 1 and 2, the portion 17 is built up with metal in both width and thickness so as to have a cross-sectional area at least 3 times that of the depending wire portion, and up to about 6–8 times the cross-sectional area thereof. The construction is such that the increased mass of metal contained in this inwardly extending leg provides a heat absorbing and retaining portion, from which the normal heat conductance through the vertical wire portion of smaller cross-sectional area is incapable of withdrawing sufficient heat between engine cycles as to reduce the temperature of portion 17 below a glowing incandescence.

Preferably substantially all of the inwardly extending leg 17 is built up with metal in this manner so as to provide a substantial volume of heat absorbing and retaining metal at the lower extremity of the electrode 16 and immediately adjacent the spark gap 18. The electrode 16 can be formed from a metal wire of uniform cross-section throughout its length, with the lower end bent at right angles in the manner indicated, and the lower end then built up with weld to the mass of cross-section desired. Or the electrode 16 can be formed in any other suitable manner, such as by providing a wire having a lower bent end of substantially increased diameter; or by welding a lower metal mass to a regular wire electrode. While the particular shape and cross section of the glow portion 17 can be varied widely, it is formed with an upper flattened portion 18 opposite the depending end of the electrode 15. Preferably, the sides of this glow portion are curved gently as shown in Figure 2, while the bottom surface is comparatively flat or gently rounded.

It will be understood that the electrodes 15 and 16 are purposely extended so as to depend down into the active portion of the combustion space where they are directly contacted by the combustible gases and exposed to the direct heat of the combustion, when the plug is mounted in the engine cylinder. After the engine has been started and combustion initiated through timed sparks jumping the gap 18, the built-up portion 17 will rapidly absorb and retain a glowing red to white heat between successive cycles, whereby the ignition on succeeding cycles is accomplished by a combination of glowing heat and spark action. Moreover, since the glow portion 17 retains its glowing heat of igniting effectiveness between successive cycles, ignition of the first increment of injected fuel on succeeding cycles is insured as soon as the resulting combustible fuel vapor-air mixture contacts the electrodes, even in the event of spark failure at the gap 18 or improper timing of this spark. It also appears that, with proper timing of the spark, the conjoint action of the glow surface with the high intensity spark increases the area of ignitible contact of the localized segment of combustible mixture and promotes more rapid and effective ignition of the latter to establish the flame front.

While the specific construction illustrated constitutes a preferred embodiment of the invention, it is to be understood that the shape and construction of the electrodes can be varied from that shown. Thus, either or both of the electrodes 15 and 16 can be provided with a built-up glow portion or portions adjacent their outer extremities and opposite the spark gap. Moreover, while the outer electrode is shown as extended inwardly to underlie the axial insulated electrode, it will be apparent that the center electrode can be extended downwardly to underlie the depending end of the outer electrode. Moreover, instead of providing the spark gap 18 between the depending end of one electrode and the horizontal extending portion of the other, the spark gap can be formed between the side wall of the depending vertical portion of one electrode and the bent end of the other electrode. In all embodiments, it will be understood that at least one of the electrodes is provided near its outer extremity and adjacent the spark gap with such an increased mass of metal, the increase being in both width and thickness, as to provide a high volume to surface ratio. In this manner, the heat-absorbing capacity of the built-up portion is sufficient to counterbalance the normal heat conducting capacity of the remainder of that electrode, as well as the heat lost by radiation and convection from said glow portion, whereby the said portion is maintained at glowing incandescence between successive engine cycles.

By way of specific example, a combination spark-glow plug was constructed substantially as shown in Figures 1 and 2. The axial insulated electrode 15 was formed of No. 12 gauge Nichrome wire and was extended ¾" below the bottom of the metal shell 11 of the plug body. The grounded electrode 16 was also constructed of No. 12 gauge Nichrome wire with the lower end bent inwardly at right angles to underlie the end of electrode 15, and with this end built up with weld to provide a shape substantially as shown and a cross-sectional area throughout most of the length of the inwardly extending portion varying between 4 and 5 times the cross-sectional area of the Nichrome wire. The plug was found to function very satisfactorily in the non-knocking fuel injection engine as heretofore described.

Obviously many modifications and variations of the invention, as hereinbefore set forth, may be made without departing from the spirit and scope thereof and, therefore, only such limitations should be imposed as are indicated in the appended claims.

We claim:

1. A combination spark-glow plug having a plug body, an axial insulated wire electrode depending below said plug body, an outer grounded wire electrode attached at its upper end to a lower peripheral portion of said plug body and depending below said plug body slightly farther than said axial electrode and then extending inwardly at substantially right angles to underlie the lower end of said axial electrode and spaced therefrom to form a spark gap therebetween, substantially the entire inwardly extending part of said grounded electrode being materially enlarged in both width and thickness and formed of solid metal to provide a heat retaining glow portion having a cross-sectional area at least three times that of the depending wire part of said grounded electrode, said depending wire portion constituting the sole connection between said enlarged glow portion of the grounded electrode and said plug body, with the length of said depending wire portion being large in relation to the cross-sectional area thereof to thereby restrict the heat conducting path from said enlarged glow portion to the said plug body, and the volume of metal and the volume to surface ratio of said glow portion being large such that said glow portion retains heat of igniting effectiveness between successive cycles capable of igniting a combustible fuel vapor-air mixture without the aid of a spark, both said electrodes being freely exposed below said plug body and maintained at all times in spaced relation to each other to maintain an air gap therebetween for the jumping of a spark on each cycle in addition to the maintenance of said glow portion at igniting effectiveness between successive cycles.

2. A combination spark-glow plug having a plug body, an axial insulated wire electrode depending in excess of one-half inch below said plug body, an outer grounded electrode having a depending wire portion of about No. 12 gauge wire attached at its upper end to a lower peripheral portion of said plug body and depending vertically slightly farther than said axial electrode and then bent inwardly at substantially right angles to underlie the lower end of said axial electrode and spaced therefrom to form a spark gap therebetween, substantially the entire inwardly bent end of said grounded electrode being built up with metal in both width and thickness and being solid to provide a heat retaining glow portion having a cross-sectional area about 3 to 8 times that of the depending wire portion of said grounded electrode, said depending wire portion constituting the sole connection between said enlarged glow portion of the grounded electrode and the said plug body, whereby the substantial length and the small diameter of said depending wire portion restricts the heat conducting path from said glow portion to the said plug body, and the volume of metal and volume to surface ratio of said glow portion is thereby effective to retain heat of igniting intensity between successive cycles capable of igniting a fuel vapor-air mixture without the aid of a spark, both said electrodes being freely exposed below said plug body and maintained at all times in spaced apart relation to each other to maintain an air gap therebetween for the jumping of a spark on each cycle in addition to the maintenance of said glow portion at igniting effectiveness between successive cycles.

WILLIAM T. TIERNEY, Jr.
CHARLES W. DAVIS, Jr.

REFERENCES CITED

The following references are of record in the file of this patent:

UNITED STATES PATENTS

| Number | Name | Date |
|---|---|---|
| 1,253,570 | Berry | Jan. 15, 1918 |
| 1,354,126 | Olson | Sept. 28, 1920 |
| 1,359,514 | Lightfoot | Nov. 23, 1920 |
| 1,359,996 | Kahn | Nov. 23, 1920 |
| 1,579,625 | Banghart | Apr. 6, 1926 |
| 2,322,616 | Carson et al. | June 22, 1943 |